United States Patent [19]

Milo et al.

[11] Patent Number: 4,949,208

[45] Date of Patent: Aug. 14, 1990

[54] MULTIHEAD MAGNETIC HEAD ASSEMBLY HAVING A SINGLE PIECE FACEPLATE OF MAGNETIC FERRITE

[75] Inventors: Richard K. Milo, El Toro; John D. Ricards, Del Mar, both of Calif.

[73] Assignee: Eastman Kodak Company, Rochester, N.Y.

[21] Appl. No.: 417,977

[22] Filed: Oct. 4, 1989

Related U.S. Application Data

[63] Continuation of Ser. No. 181,130, Apr. 13, 1988, abandoned.

[51] Int. Cl.⁵ .............................................. G11B 5/187
[52] U.S. Cl. .................................... 360/122; 360/129
[58] Field of Search ............... 360/122, 121, 129, 125

[56] References Cited

U.S. PATENT DOCUMENTS

| | | | |
|---|---|---|---|
| 3,390,451 | 7/1968 | Peloschek | 29/603 |
| 3,400,386 | 9/1968 | Sinott | 29/603 |
| 3,466,637 | 9/1969 | Hagadorn | 29/603 |
| 3,543,396 | 12/1970 | Illg et al. | 29/603 |
| 3,544,982 | 12/1970 | Hanak | 29/603 |
| 3,668,775 | 6/1972 | Morita et al. | 29/603 |
| 3,761,641 | 9/1973 | Mlinaric | 360/129 |
| 3,789,505 | 2/1974 | Huntt | 29/603 |
| 3,842,494 | 10/1974 | Chiba et al. | 29/603 |
| 3,909,932 | 10/1975 | Kroon | 29/603 |
| 4,649,450 | 3/1987 | Linke | 360/129 |

FOREIGN PATENT DOCUMENTS 0080508  4/1986  Japan ................................ 360/122

OTHER PUBLICATIONS

Albrecht et al., "Shield for Magnetic Head Assembly", IBM TDB, May 1974, vol. 16, No. 12, p. 4057.
"Magnetic Tape Recording Technical Fundamentals", 4th printing revised, 1984, pp. 23-25.
"The Complete Handbook of Magnetic Recording", Jorgensen, 1980, pp. 158-166.

*Primary Examiner*—David J. Severin
*Attorney, Agent, or Firm*—William F. Noval

[57] ABSTRACT

A magnetic head assembly has a plurality of magnetic heads of magnetic ferrite bonded in a single piece faceplate of magnetic ferrite. The magnetic heads are substantially surrounded by the magnetic ferrite faceplate. The bulk shielding properties of the magnetic ferrite faceplate effectively shield each magnetic head from crosstalk produced by other heads. Preferably, the faceplate and magnetic heads are formed from the same magnetic ferrite. The magnetic head assembly of the invention has application for use in magnetic tape recorders and magnetic disc drives.

9 Claims, 3 Drawing Sheets

MULTIHEAD MAGNETIC HEAD ASSEMBLY HAVING A SINGLE PIECE FACEPLATE OF MAGNETIC FERRITE

This application is a continuing application of Ser. No. 181,130, filed Apr. 13, 1988.

BACKGROUND OF THE INVENTION

This invention relates in general to a magnetic head assembly for use in magnetic media reproduction systems such as magnetic tape recorders. More particularly, this invention relates to a magnetic head assembly which includes a plurality of magnetic heads bonded into a single piece faceplate of magnetic ferrite which provides effective magnetic shielding between magnetic heads and a stable and long life mechanical structure.

Magnetic head assemblies used in magnetic tape recorders and magnetic disc drives must meet more demanding design specifications necessitated by high density recording formats. Thus, in a high density magnetic tape recorder, the tape bearing surfaces (such as magnetic head tips and non-magnetic faceplate surfaces) must be durable in order to provide long head life despite high pressure contact over the head gap area with highly abrasive magnetic tape media (such as chromium dioxide tape). The faceplate and heads should have compatible wear properties to prevent head undercut and separation loss. Moreover, the magnetic head assembly must have mechanical stability and be able to withstand environmental changes (temperature, humidity, shock and vibration) without performance degradation. The magnetic head core structure must be optimized to minimize crosstalk between heads in adjacent tracks and between read and write heads in the same track. The magnetic head assembly should also have a cost effective design in order to be competitive in a highly cost sensitive market.

Numerous proposals have been made to utilize both magnetic and non-magnetic ferrite materials in magnetic head assembly design. High density ferrites are generally mechanically stable;are highly resistant to abrasion; and provide good magnetic signal recording and reproduction characteristics. Typically, a multichannel magnetic head assembly has been formed from a large number of individual elements. A typical head assembly, which is made of two half brackets (or two half shells) screwed and epoxied together, would include individual ferrite (or metal) cores wound with the necessary turns of electrical conductor. The cores are then (1) loaded into the half brackets, (2) cemented in place, and (3) connected to electrical terminal boards or electrical connector plates inserted into the bottom of the half brackets. Tip plates (which form the front surface of the magnetic head assembly) are slotted to accommodate intertrack magnetic shields and grooved to receive magnetic head tip pieces which are especially hard and durable. The tip plates are then attached to the loaded half brackets providing intimate contact between the tip pieces and the top of the ferrite cores. The magnetic gap of each head is then formed by vacuum deposition of silicon monoxide and the two half brackets bonded together. The front surface contacting the tape is then contoured (see for example, the Bell & Howell publication entitled, "MAGNETIC TAPE RECORDING TECHNICAL FUNDAMENTALS", 4th printing revised, 1984, pp. 23 et. seq.; "THE COMPLETE HANDBOOK OF MAGNETIC RECORDING", by Jorgensen, 1980 ed., pub. by TAB Books, Inc., Blue Ridge Summit, PA, pp. 158 et seq.; and U.S. Pat. No. 3,400,386, entitled "Multichannel Magnetic Read Assembly", issued Sept. 3, 1968, by R.C. Sinnott). Such magnetic head assemblies are disadvantageous because of the difficulty and expense in producing them. Moreover, the number of assemblies which must be discarded due to incorrect component positioning is high.

Multichannel magnetic head assemblies have also been proposed, in which a plurality of magnetic ferrite heads are bonded to a split non-magnetic ferrite faceplate. Individual magnetic shields are secured between adjacent heads to minimize crosstalk and the structure mounted in an aluminum shell (see for example, U.S. Pat. No. 3,668,775 issued June 13, 1972, entitled "Method for Manufacturing Magnetic Heads", by Morita et al; and U.S. Pat. No. 3,789,505, issued Feb. 5, 1974 entitled "Method Of Making a Multi-Core Magnetic Head With A Non-Magnetic Holder" by R.L. Huntt). Such magnetic head assemblies are disadvantageous in the use of individual magnetic shields between adjacent heads and in the use of different ferrite materials in the faceplate structure thus increasing mechanical instabilities.

Magnetic head assemblies are also known in which magnetic ferrite cores are mounted in non-magnetic ferrite holders and individual magnetic ferrite shields are inserted between adjacent magnetic heads (see for example, U.S. Pat. No. 3,909,932, issued Oct. 7, 1975, entitled "Method of Manufacturing A Multi-Track Magnetic Head", by W.L. Kroon; U.S. Pat. No. 3,842,494, issued Oct. 22, 1974 entitled "Multi-Channel Magnetic Ferrite Head And A Method For Making The Same", by H. Chiba et al; and U.S. Pat. No. 3,761,641 issued Sept. 25, 1973, entitled "Magnetic Head With Demountable Face Part Assembly", by T.A. Mlinarick). Each of the magnetic head assemblies disclosed in these patents is disadvantageous because of the large number of parts required to form the magnetic head assembly and because of the difficulty in properly aligning the magnetic head gaps across the width of the assembly. Such magnetic head assemblies are also complex and expensive to produce.

In order to reduce the number of individual parts used in a multi-head magnetic head assembly and in order to effect exact alignment of magnetic head gaps across the width of the head assembly, it has been proposed to form a plurality of individual heads from blocks of magnetic ferrite. The magnetic ferrite blocks are ground down to form individual magnetic head core pieces. The structure is lapped, gapped and bonded to form a multi-head magnetic assembly. The individual heads may be commonly joined together by a portion of the magnetic ferrite block which is not removed. Such assemblies are disclosed in U.S. Pat. No. 3,544,982, issued Dec. 1, 1970, entitled "Multi-Head Magnetic Assembly", by J.J. Hanak. As disclosed, the rear portion of the magnetic heads is commonly joined by a solid magnetic ferrite piece which is integral with the individual head cores. U.S. Pat. No. 3,543,396, issued Dec. 1, 1970 entitled "Method Of Multi-Track, Two-Gap, Ferrite Magnetic Heads Design Especially For Digital Recording", by Z. Illg et al, discloses a magnetic head assembly in which three blocks of magnetic ferrite are lapped, gapped and bonded together. The bonded structure is ground down to provide a multi-track magnetic head assembly in which each track has a pair of in line heads separated from each other. In the embodiments shown in FIGS. 6 and 7, a centrally disposed solid magnetic ferrite piece runs the width of the head assembly and is integral with the inner core leg of each head in the assembly. These magnetic head assemblies are disadvantageous (1) in using separate magnetic shields between adjacent heads and between in-line heads and (2) in using an integral magnetic ferrite shunt between adjacent heads in the magnetic assembly which increases the likelihood of crosstalk between heads in the same track and between heads in adjacent tracks.

SUMMARY OF THE INVENTION

According to the present invention, there is provided a multi-head magnetic head assembly which substantially solves the problems of known multi-head magnetic head assemblies, as, for example, disclosed in the above patents. The mult-head magnetic head assembly of the present invention has the following advantages: (1) effective magnetic shielding optimization so that crosstalk between heads in different tracks and between heads in the same track is substantially suppressed; (2) increased durability and resistance to highly abrasive magnetic media such as tape with which the head assembly comes into contact; (3) high degree of mechanical stability and resistance to environmental changes (such as temperature, humidity, shock and vibration) without performance degradation; (4) cost effective design for competitiveness in a highly cost sensitive market through the use of a minimum of head assembly components; and (5) consistent performance between heads within a track and between heads in adjacent tracks.

According to an aspect of the present invention, these advantages are achieved by means of a magnetic head assembly which includes a single piece faceplate of magnetic ferrite in which are bonded a plurality of magnetic heads of magnetic ferrite. Preferably, the faceplate and magnetic heads are of the same magnetic ferrite. According to another aspect of the invention. The single piece magnetic ferrite faceplate surrounds each head, thus effectively shielding each magnetic head from crosstalk from other magnetic heads. According to a further aspect of the invention the magnetic head assembly includes a minimum number of components, thus greatly increasing the cost effectiveness and reliability of the assembly. Individual magnetic shields separating adjacent magnetic heads are eliminated, since the single piece magnetic ferrite faceplate of the invention provides maximum shielding for each head. Moreover, the single piece faceplate can be easily electrically grounded at a single point to minimize buildup of static electricity on the head assembly.

BRIEF DESCRIPTION OF THE DRAWINGS

In the following description of the drawings, like elements are numbered with like numbers.

FIG. 4 is a bottom plan view of the embodiment of FIG. 1.

DESCRIPTION OF THE PREFERRED EMBODIMENT

Figure 1:
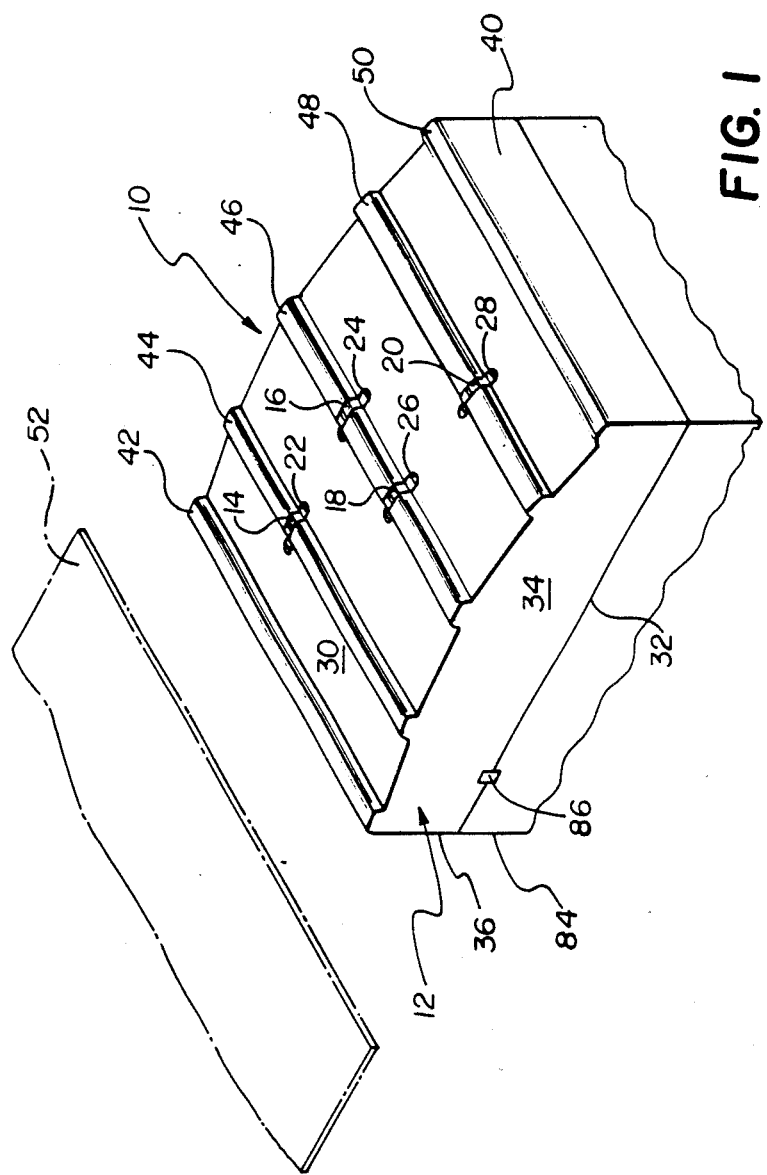
FIG. 1 is a perspective view of an embodiment of the present invention.
Figure 2:
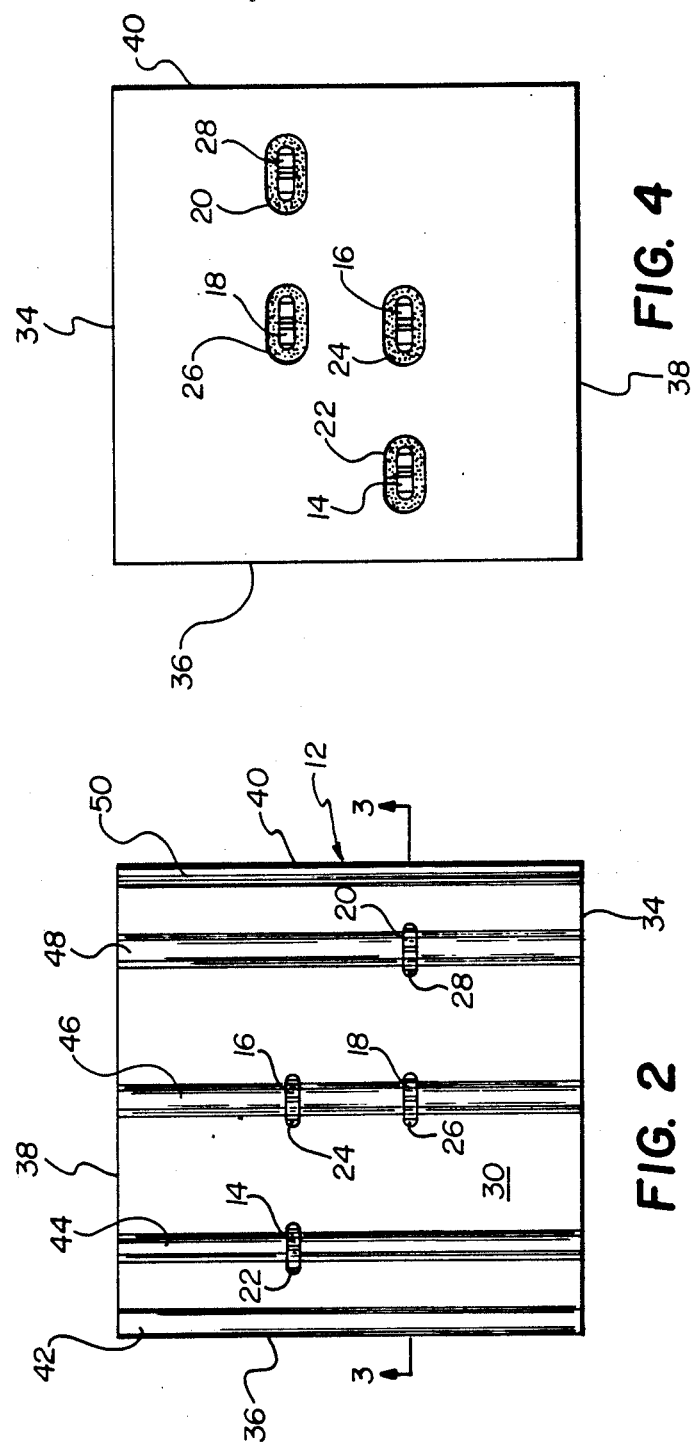
FIG. 2 is a top plan view of the embodiment of FIG. 1.

Referring now to the Figures, a preferred embodiment of a multihead magnetic head assembly according to the present invention will be described. Such multihead magnetic head assemblies are used, for example, in magnetic tape recorders and magnetic floppy and hard disc drives used in computers. Although a specific embodiment of magnetic head assembly is illustrated, it will be understood that other embodiments of multihead magnetic head assemblies are within the scope of the present invention. As shown in FIG. 1, magnetic head assembly 10 includes a generally rectangular faceplate 12 having a plurality of magnetic heads 14, 16, 18 and 20 respectively bonded in slots 22, 24, 26, and 28 which extend through the thickness of faceplate 12. Faceplate 12 has a generally curved upper face 30, lower face 32 and sides 34, 36, 38 and 40. Upper face 30 has a plurality of ridges or rails 42, 44, 46, 48 and 50 for providing good head to face contact between magnetic media such as tape 52 and the head gaps of heads 14–20. Heads 14, 16, 18, 20 are arranged in a dual head, two track configuration. Thus, heads 14 and 16 are aligned in one track and heads 18 and 20 are aligned in another track. Moreover, the gaps of heads 16 and 18 are in alignment. According to the invention, the magnetic gaps of heads 14, 16, 18, 20, satisfy demanding gap azimuth specifications.

Figure 3:
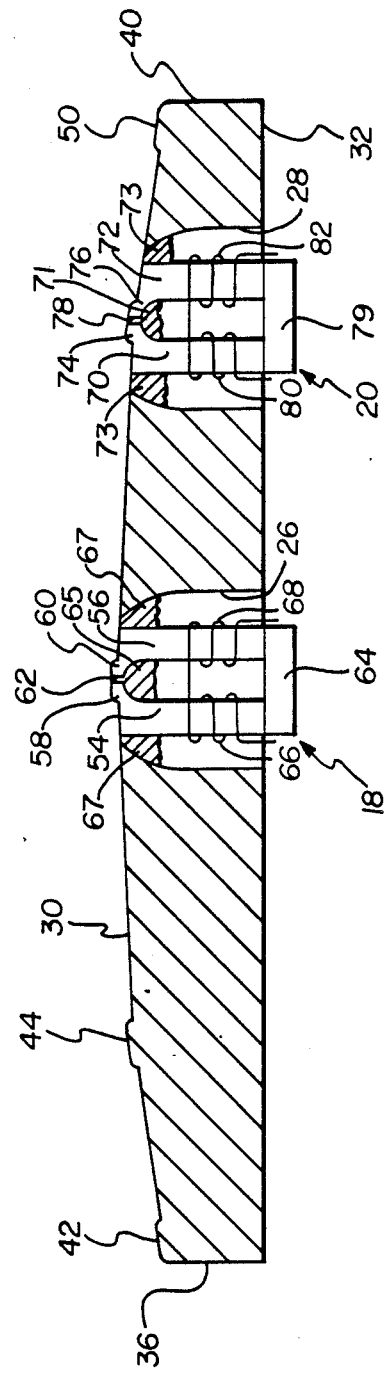
FIG. 3 is a partially sectional side elevational view of the embodiment of FIG. 1.

As shown more clearly in FIG. 3, magnetic head 18 includes core elements 54 and 56 having head tips 58 and 60 separated by a head gap 62 of non-magnetic material. Non-magnetic material (such as epoxy or glass) bonds elements 54 and 56 together (such as at 65) and also bonds head 18 in slot 26 of faceplate 12 (such as at 67). A back bar 64 of magnetic ferrite shunts the ends of core elements 54 and 56. Electrically connected coils 66 and 68 are respectively wound on core elements 54 and 56. Similarly, magnetic head 20 includes core elements 70 and 72 having head tips 74 and 76 separated by head gap 78. Non-magnetic bonding material bonds elements 70 and 72 together (as at 71) and bonds head 20 in slot 28 of faceplate 12 (as at 73). A back bar 78 of magnetic ferrite shunts the ends of core elements 70 and 72. Electrically connected coils 80 and 82 are respectively wound on elements 70 and 72.

The cross sectional areas of slots 22, 24, 26 and 28 broaden out below face 30 in order to accommodate coils, such as 66 and 68 on head 18, and 80 and 82 on head 20. According to the present invention, faceplate 12 is a single piece of magnetic ferrite (such as manganese zinc ferrite or the like). Faceplate 12 is preferably of the same magnetic ferrite material as magnetic heads 14, 16, 18 and 20. The thickness of faceplate 12 is preferably equal to or greater than the length of the core elements of heads 14–20. Thus, as shown in FIG. 3, the ends of core elements 54 and 56 of head 18 and core elements 70 and 72 of head 20 are substantially coplanar with the lower surface 32 of faceplate 12. Since magnetic heads 14–20 are substantially surrounded by magnetic ferrite faceplate 12, each head is effectively shielded from crosstalk produced by other heads in the assembly.

As shown in FIG. 1, faceplate 12 is grounded by conductor 84 to an aluminum support member 86 which forms part of the magnetic head assembly support structure. Grounding minimizes static buildup and stray electric currents which produce localized magnetic fields. The head tips of heads 14–20 are flush with rails 44, 46 and 48 so that wear on heads 14–20 and faceplate 12 is substantially the same. Face 30 of faceplate 12 can be either machined or molded to shape. The magnetic ferrite of both faceplate 12 and heads 14–20 is preferably of a high density, hot pressed or hot isostatic pressed material in order to provide long life and mechanical stability.

The magnetic heads 14–20 may be individually supported relative to faceplate 12 prior to bonding or may be assembled with faceplate 12 according to the method disclosed in copending U.S. Pat. No. 4,825,532, entitled "Method For Making A Multi-Head Magnetic Head Assembly".

The magnetic head assembly of the present invention has the following advantages, among others: (1) the use of a single piece magnetic ferrite faceplate for supporting and shielding a plurality of magnetic heads significantly reduces the number of separate components in the magnetic head assembly by eliminating individual shields between magnetic heads and individual support structure for each magnetic head; (2) magnetic shielding between heads is optimized by the bulk shielding properties of the single piece magnetic ferrite faceplate structure and by the substantially uninterrupted head assembly to magnetic media interface which minimizes localized magnetization; (3) the single piece magnetic ferrite faceplate assembly has increased durability, increased mechanical stability, and increased ability to withstand environmental changes such as temperature, humidity, shock and vibration without performance degradation.

It will be understood that the magnetic head assembly of the present invention may be configured to include any number of tracks and any number of magnetic heads within a track. Thus, for example, instead of having two tracks with two heads in each track, the magnetic head assembly may include three or more tracks with two, three or more heads within each track. Moreover, the dimensions of the magnetic head assembly are not critical. For example, the magnetic head assembly of FIG. 1 may be used with magnetic tape having a width of from 4–25 mm.

The invention has been described in detail with particular reference to preferred embodiments thereof, but it will be understood that variations and modifications can be effected within the spirit and scope of the invention.

What is claimed is:

1. A multihead magnetic head assembly comprising:
   a single piece faceplate of magnetic ferrite wherein said faceplate (1) has a face which interfaces with magnetic media and (2) has a plurality of slots opening on said face and extending into said faceplate;
   a plurality of magnetic heads of magnetic ferrite wherein each head has a tip with a head gap; and
   means for bonding said magnetic heads within the slots of said magnetic ferrite faceplate by means of non-magnetic bonding material, wherein head gap tips of said magnetic heads are located at said media interfacing face of said faceplate wherein said media is only contacted by said face of said magnetic ferrite faceplate and by said magnetic head tips, and wherein said magnetic heads are substantially surrounded by the magnetic ferrite faceplate so that said magnetic ferrite faceplate shields individual magnetic heads from external magnetic fields such as produced by other magnetic heads in the head assembly.

2. The magnetic head assembly of claim 1 wherein said faceplate and said magnetic heads are of the same magnetic ferrite.

3. The magnetic head assembly of claim 1 wherein said magnetic heads are glass or epoxy bonded within said magnetic ferrite faceplate.

4. The magnetic head assembly of claim 1 wherein said faceplate is high density magnetic ferrite material.

5. The magnetic head assembly of claim 1 wherein said slots in said faceplate and said heads are dimensioned to be substantially coextensive.

6. A multihead magnetic head assembly comprising:
   a single piece faceplate of magnetic ferrite, wherein said faceplate (1) has a first face which interfaces with magnetic media and a second opposite face, and (2) has a plurality of slots opening on said faces and extending through said faceplate;
   a plurality of magnetic heads of magnetic ferrite wherein each head has a tip with a head gap and a core structure; and
   means for bonding said magnetic heads within the slots of said magnetic ferrite faceplate by means of non-magnetic bonding material, wherein said head gap tips of said head are located at said first face of said faceplate, wherein said media is only contacted by said first face of said magnetic ferrite faceplate and by said magnetic head tips, wherein said head core structure extends into said slots and wherein said magnetic heads are substantially surrounded by the magnetic ferrite faceplate so that said magnetic ferrite faceplate shields individual magnetic heads from external magnetic fields such as produced by other magnetic heads in the head assembly.

7. The magnetic head assembly of claim 6 wherein said assembly includes at least two magnetic heads which are arrayed side by side in separate tracks, in which the respective head gaps of said heads are substantially aligned.

8. The magnetic head assembly of claim 6 wherein said assembly includes at least two magnetic heads which are arrayed in line in the same track, in which the respective heads gaps of said heads are substantially parallel.

9. The magnetic head assembly of claim 6 wherein said assembly includes at least four magnetic heads which are arrayed in at least two parallel tracks with at least two heads in line in each track, in which the respective head gaps of said heads in each track are substantially parallel.

* * * * *